US010411234B2

United States Patent
Lee et al.

(10) Patent No.: US 10,411,234 B2
(45) Date of Patent: Sep. 10, 2019

(54) METHOD OF PREPARING SEPARATOR FOR LITHIUM SECONDARY BATTERY, SEPARATOR PREPARED THEREFROM, AND LITHIUM SECONDARY BATTERY COMPRISING THE SAME

(71) Applicants: LG Chem, Ltd., Seoul (KR); TORAY INDUSTRIES, INC., Tokyo (JP)

(72) Inventors: Joo-Sung Lee, Daejeon (KR); Jong-Hun Kim, Daejeon (KR)

(73) Assignees: LG Chem, Ltd. (KR); TORAY INDUSTRIES, INC. (JP)

( * ) Notice: Subject to any disclaimer, the term of this patent is extended or adjusted under 35 U.S.C. 154(b) by 117 days.

(21) Appl. No.: 14/296,745

(22) Filed: Jun. 5, 2014

(65) Prior Publication Data

US 2014/0287294 A1 Sep. 25, 2014

Related U.S. Application Data

(63) Continuation of application No. PCT/KR2013/008545, filed on Sep. 24, 2013.

(30) Foreign Application Priority Data

Sep. 24, 2012 (KR) .................. 10-2012-0105790
Sep. 24, 2013 (KR) .................. 10-2013-0113204

(51) Int. Cl.
*H01M 2/14* (2006.01)
*H01M 2/16* (2006.01)
(Continued)

(52) U.S. Cl.
CPC ......... *H01M 2/145* (2013.01); *H01M 2/1646* (2013.01); *H01M 2/1653* (2013.01);
(Continued)

(58) Field of Classification Search
CPC ... H01M 2/145; H01M 2/1646; H01M 2/1686
(Continued)

(56) References Cited

U.S. PATENT DOCUMENTS 5,573,825 A * 11/1996 Brewster ................... G09F 7/00
                                                    283/75
7,517,076 B2 * 4/2009 Stelter ..................... B41J 2/0057
                                                    347/103
(Continued)

FOREIGN PATENT DOCUMENTS

JP  2001-307708 A  11/2001
JP  2006527461 A   11/2006
(Continued)

OTHER PUBLICATIONS

Lago, et al. Anal. Chem. 2003, 75, 3853-3858 (Year: 2003).*
International Search Report for Application No. PCT/KR2013/008545 dated Jan. 20, 2014.

*Primary Examiner* — Stewart A Fraser
*Assistant Examiner* — Victoria H Lynch
(74) *Attorney, Agent, or Firm* — Lerner, David, Littenberg, Krumholz & Mentlik, LLP

(57) ABSTRACT

The present invention provides a method of preparing a separator for a lithium secondary battery, comprising: forming a porous coating layer on at least one surface of a porous substrate, the porous coating layer comprising inorganic particles; bringing polymer particles into electric charging to obtain electrically charged polymer particles; transferring the electrically charged polymer particles on the top surface the porous coating layer to form a functional coating layer; and fixing the functional coating layer with heat and pressure, a separator prepared by the method, and a lithium secondary battery comprising the separator.

14 Claims, 1 Drawing Sheet

(51) Int. Cl.
*H01M 10/052* (2010.01)
*H01M 10/0568* (2010.01)
*H01M 10/0569* (2010.01)

(52) U.S. Cl.
CPC ....... *H01M 2/1686* (2013.01); *H01M 10/052* (2013.01); *H01M 10/0568* (2013.01); *H01M 10/0569* (2013.01)

(58) Field of Classification Search
USPC .................. 427/562, 593, 596; 429/144; 430/124.51, 120.2, 123.5, 596
See application file for complete search history.

(56) References Cited

U.S. PATENT DOCUMENTS

| | | | | |
|---|---|---|---|---|
| 2001/0001472 | A1* | 5/2001 | Sano | G06K 7/12 235/462.01 |
| 2002/0071915 | A1 | 6/2002 | Schubert et al. | |
| 2006/0121342 | A1* | 6/2006 | Sano | H01M 4/13 429/162 |
| 2009/0311418 | A1* | 12/2009 | Hennige | C08J 7/06 427/101 |
| 2010/0323230 | A1* | 12/2010 | Lee | H01M 2/166 429/143 |
| 2011/0311855 | A1 | 12/2011 | Peng et al. | |
| 2012/0169297 | A1 | 7/2012 | Schaefer et al. | |
| 2013/0316219 | A1* | 11/2013 | Ha | H01M 2/145 429/144 |
| 2014/0017557 | A1* | 1/2014 | Lockett | H01M 2/164 429/189 |
| 2014/0050965 | A1 | 2/2014 | Ha et al. | |

FOREIGN PATENT DOCUMENTS

| | | |
|---|---|---|
| KR | 20040005550 A | 1/2004 |
| KR | 20080042967 A | 5/2008 |
| WO | 2005112151 A1 | 11/2005 |
| WO | 2012/111956 A2 | 8/2012 |

* cited by examiner

METHOD OF PREPARING SEPARATOR FOR LITHIUM SECONDARY BATTERY, SEPARATOR PREPARED THEREFROM, AND LITHIUM SECONDARY BATTERY COMPRISING THE SAME

CROSS-REFERENCE TO RELATED APPLICATION

This application is a continuation of International Application No. PCT/KR2013/008545 filed on Sep. 24, 2013, which claims priority under 35 USC 119(a) to Korean Patent Application No. 10-2012-0105790 filed in the Republic of Korea on Sep. 24, 2012, and Korean Patent Application No. 10-2013-0113204 filed in the Republic of Korea on Sep. 24, 2013, the disclosures of which are incorporated herein by reference.

TECHNICAL FIELD

The present invention relates to a method of preparing a separator for a lithium secondary battery, more particularly to a method of preparing a separator having a functional coating layer formed on the surface thereof by way of laser printing without using a solvent, thereby allowing easy handling and storage to provide cost savings effect; a separator prepared therefrom; and a lithium secondary battery comprising the separator.

BACKGROUND ART

Recently, there has been an increasing interest in energy storage technology. As the application fields of energy storage technologies have been extended to cellular phones, camcorders, notebook computers, PCs and electric cars, efforts have been increasingly been made towards the research and development of electrochemical devices. In this regard, electrochemical devices are one of the subjects of great interest. Particularly, development of rechargeable secondary batteries has been the focus of attention. Recently, extensive research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries.

Generally, lithium secondary batteries consist of an anode comprising an anode active material layer, a cathode comprising a cathode active material, a separator interposed between the anode and the cathode to electrically insulate them, and a non-aqueous electrolyte solution comprising an electrolyte salt and an organic solvent.

Among these, the separator should generally satisfy the requirements of safety and heat resistance to the components of batteries, high electrolytic conductivity, and sufficient strength which can maintain its original form during its preparation, processing and application in batteries for preventing contact between both electrodes. As such a separator, a polyolefin-based porous substrate having multiple fine pores has been conventionally used.

Meanwhile, the separator may have a porous coating layer comprising inorganic particles for ensuring safety, and also may further have a functional coating layer for improving adhesion of the separator with electrodes or preventing early meltdown and shutdown of the separator during overcharging. Conventional separators applying such a functional coating layer have been prepared by coating a polymer slurry in a solvent on a porous substrate or a porous coating layer, followed by drying. In the slurry used in coating, the solvent is for obtaining flexibility as well as proper dispersion and viscosity of polymer particles. However, the use of such a solvent incurs costs which may also increase depending on the needs of the solvent, and in the case the solvent is harmful to the human body, there may be additional costs in handling and storage and since the solvent requires drying after coating, a production yield may decrease.

DISCLOSURE

Technical Problem

The present invention is designed to solve the above-mentioned problems, and therefore the present invention is directed to providing a method of preparing a separator for a lithium secondary battery by forming a functional coating layer without a solvent, which allows easy handling and storage and needs no drying step of the solvent after coating to provide cost savings effect and efficient productivity due to a quick coating procedure, as well as a separator prepared therefrom, and a lithium secondary battery comprising the separator.

Technical Solution

In accordance with one aspect of the present invention, there is provided a method of preparing a separator for a lithium secondary battery, comprising: forming a porous coating layer on at least one surface of a porous substrate, the porous coating layer comprising inorganic particles; bringing polymer particles into electric charging to obtain electrically charged polymer particles; transferring the electrically charged polymer particles on the top surface the porous coating layer to form a functional coating layer; and fixing the functional coating layer with heat and pressure.

In the present invention, the porous substrate may be made of any one selected from the group consisting of high-density polyethylene, low-density polyethylene, linear low-density polyethylene, ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate, and a mixture thereof.

The inorganic particles may be selected from the group consisting of inorganic particles having a dielectric constant of 5 or higher, inorganic particles having the ability to transport lithium ions, or a mixture thereof.

Examples of the inorganic particles having a dielectric constant of 5 or higher include $SrTiO_3$, $SnO_2$, $CeO_2$, $MgO$, $NiO$, $CaO$, $ZnO$, $ZrO_2$, $SiO_2$, $Y_2O_3$, $Al_2O_3$, $AlOOH$, $Al(OH)_3$, $TiO_2$, $SiC$, $BaTiO_3$, $Pb(Zr_x, Ti_{1-x})O_3$(PZT, $0<x<1$), $Pb_{1-x}La_xZr_{1-y}Ti_yO_3$(PLZT, $0<x<1$, $0<y<1$), $(1-x)Pb(Mg_{1/3}Nb_{2/3})O_3$-$xPbTiO_3$ (PMN-PT, $0<x<1$), $HfO_2$ inorganic particles and a mixture thereof.

Also, examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$ type glass ($0<x<4$, $0<y<13$), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$ type glass ($Li_xSi_yS_z$, 0<x<3, 0<y<2, 0<z<4), $P_2S_5$ type glass ($Li_xP_yS_z$, 0<x<3, 0<y<3, 0<z<7) inorganic particles, and a mixture thereof.

The inorganic particles may have an average diameter of 0.001 to 100 μm.

The porous coating layer may have a thickness of 1 to 100 μm.

Meanwhile, the polymer particles may be selected from the group consisting of polyvinylidene fluoride-co-hexafluoropropylene (PVDF-HFP), polyvinylidene fluoride-co-chlorotrifluoroethylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, alginate, carboxyl methyl cellulose and a mixture thereof.

The functional coating layer may have a thickness of 0.001 to 5 μm.

Also, the functional coating layer may be formed in at least one selected from line, wave, cross and random patterns.

In accordance with another aspect of the present invention, there is provided a separator for a lithium secondary battery prepared by the above method.

Further, in accordance with still another aspect of the present invention, there is provided a lithium secondary battery comprising a cathode, an anode, a separator interposed between the cathode and the anode and a non-aqueous electrolyte solution, wherein the separator is defined in the present invention.

In the present invention, the non-aqueous electrolyte solution may comprise an organic solvent and an electrolyte salt.

The organic solvent may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, fluoro ethylene carbonate (FEC), dimethyl carbonate (DMC), diethyl carbonate (DEC), dipropyl carbonate, ethyl methyl carbonate (EMC), methyl propyl carbonate, ethyl propyl carbonate, methyl acetate, ethyl acetate, propyl acetate, methyl propionate, ethyl propionate, propyl propionate, γ-butyrolactone, γ-valerolactone, γ-caprolactone, σ-valerolactone, ε-caprolactone and a mixture thereof.

The electrolyte salt may comprise an anion selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$ and a mixture thereof.

Advantageous Effects

According to the present invention, in the preparation of a separator for a lithium secondary battery, a functional coating layer is applied by using electrostatic charging, more specifically coating polymer particles by way of laser printing, without the addition of a solvent, thereby allowing easy handling and storage and needs no drying step of the solvent after coating to provide cost savings effect and efficient productivity due to a quick coating procedure.

DESCRIPTION OF DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

BEST MODE

Figure 1:
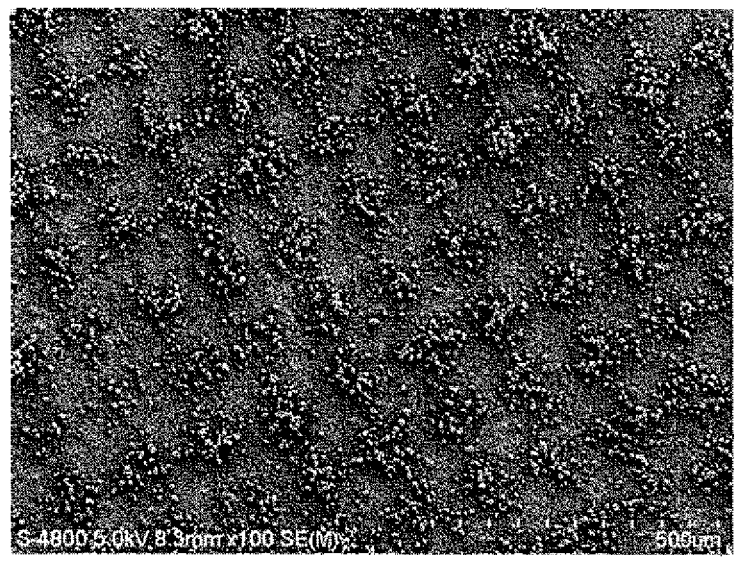
FIG. 1 is an SEM photograph showing a surface of a separator prepared by transferring polymer particles according to one embodiment of the present invention.

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Accordingly, the embodiments proposed herein are just a preferable example for the purpose of illustrations only, not intended to limit the scope of the disclosure, so it should be understood that other equivalents and modifications could be made thereto without departing from the spirit and scope of the disclosure.

In accordance with one embodiment of the present invention, a separator for a lithium secondary battery may be prepared as follows:

First, a porous coating layer comprising inorganic particles is formed on at least one surface of a porous substrate.

The porous substrate used in the present invention may be any one which is conventionally used in electrochemical devices, for example, a polyolefin-based membrane or non-woven fabric, but the present invention is not particularly limited thereto.

The polyolefin-based porous membrane may be obtained from a polyolefin-based polymer, for example, polyethylene such as high-density polyethylene, linear low-density polyethylene, low-density polyethylene and ultra-high molecular weight polyethylene, polypropylene, polybutylene, polypentene or a mixture thereof.

The non-woven fabric may be a polyolefin-based non-woven fabric, or a non-woven fabric made of a polymer selected from polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalate and a mixture thereof. The non-woven fabric may be a spun-bond or melt-blown fabric consisting of long fibers in structure.

The porous substrate has preferably a thickness of 5 to 50 μm, but is not particularly limited thereto. Also, the porous substrate has a pore size of 0.01 to 50 μm and a porosity of 10 to 95%, but is not particularly limited thereto.

As the inorganic particles, inorganic particles having a high dielectric constant may be used to increase a dissociation rate of an electrolyte salt, e.g., a lithium salt, in a liquid electrolyte, thereby improving an ionic conductivity of the electrolyte.

For the foregoing reasons, the inorganic particles used in the present invention preferably include inorganic particles having a dielectric constant of 5 or higher, preferably 10 or higher, inorganic particles having the ability to transport lithium ions, and a mixture thereof.

Non-limiting examples of the inorganic particles having a dielectric constant of 5 or higher include $SrTiO_3$, $SnO_2$, $CeO_2$, $MgO$, $NiO$, $CaO$, $ZnO$, $ZrO_2$, $SiO_2$, $Y_2O_3$, $Al_2O_3$, $AlOOH$, $Al(OH)_3$, $TiO_2$, $SiC$, $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$), $HfO_2$ inorganic particles and a mixture thereof.

Among these, inorganic particles such as $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$) and hafnia ($HfO_2$) exhibit a high dielectric characteristic of a dielectric constant of 100 or higher, as well as piezoelectricity which occurs when constant pressure is applied to induce a potential difference between both surfaces, thereby preventing the generation of internal short circuit between both electrodes due to external impact and thus further improving the safety of electrochemical devices. Also, when a mixture of inorganic particles having a high dielectric constant and inorganic particles having the ability to transport lithium ions is used, the synergetic effect thereof can be obtained.

In the present invention, the inorganic particle having the ability to transport lithium ions refers to inorganic particles containing lithium atom which are capable of moving lithium ions without storing the lithium. The inorganic particle having the ability to transport lithium ions may transfer and move lithium ions due to a kind of defect existing in the particle structure, so it is possible to improve lithium ion conductivity in the battery and also improve the performance of the battery. Non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof.

The inorganic particles may have an average diameter of 0.001 to 100 μm, preferably 0.01 to 50 μm. When such a diameter range of the inorganic particles is satisfied, the specific surface area of the inorganic particles becomes remarkably increased to solve the problem that a binder for binding the inorganic particles is used in an excess of amounts, and also it can provide a proper thickness of the porous coating layer, a proper pore size between the inorganic particles and a proper porosity.

Also, the porous coating layer may have a thickness of 1 to 100 μm, preferably 1 to 40 μm, more preferably 2 to 15 μm. When such a thickness range of the porous coating layer is satisfied, an additional transferring path of lithium ions can be further added and the impregnation of an electrolyte solution can improve to enhance the performances and thermal safety of batteries.

Subsequently, polymer particles are brought into electric charging to obtain electrically charged polymer particles (electric charging step).

The electric charging may be carried out by placing the polymer particles in a storage bath and charging them with positive or negative electric charges, e.g., by corona discharge which uses high voltage for applying electrostatic force to the polymer particles, arc discharge, or frictional electricity generation which uses the ability of substances having different properties to exchange charges when the substances come into contact with each other. However, the present invention is not limited thereto. By such an electric charging, the polymer particles are driven to instantaneously or continuously attach on the porous coating layer.

The polymer particles used in the present invention may be any one selected from the group consisting of polyvinylidene fluoride-co-hexafluoropropylene (PVDF-HFP), polyvinylidene fluoride-co-chlorotrifluoroethylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, alginate, carboxyl methyl cellulose and a mixture thereof.

Then, the electrically charged polymer particles are transferred into the top surface of the porous coating layer to form a functional coating layer (transferring step).

If the polymer particles are charged with positive or negative electric charges, the porous coating layer may be inversely charged with negative or positive electric charges. Accordingly, when the porous coating layer is located around the electrically charged polymer particles, the electrically charged polymer particles attach on the porous coating layer by electrostatic force to form a functional coating layer.

The functional coating layer may act as a layer for scavenging transition metals, for preventing shutdown or for adhesion with electrodes. Such a function may vary depending on the kinds of the polymer particles.

For example, if the functional coating layer acts as a layer for scavenging transition metals, modified polyvinyl alcohol or alginate may be used as the polymer particles. If the functional coating layer acts as a layer for preventing shutdown, polyethylene may be used as the polymer particles. Also, if the functional coating layer acts as a layer for adhesion with electrodes, polyvinylidene fluoride-co-hexafluoropropylene may be used as the polymer particles.

The functional coating layer may have a thickness of 0.001 to 5 μm, but is not limited thereto. When such a thickness range is satisfied, resistance increase within batteries can be prevented, the functional coating layer can properly perform each function.

Also, the functional coating layer may be formed in a pattern capable of transferring lithium ions favorably, e.g., any one selected from line, wave, cross and random patterns.

Finally, the functional coating layer is fixed on the porous coating layer with heat and pressure (fixing step).

For example, the functional coating layer may pass through heating and press rollers for heating and compression. This step may be carried out at a temperature of 60 to 180° C. and a pressure of 1 to 300 kgf/cm² for uniformity of the coating layer.

Also, the present invention provides a lithium secondary battery comprising a cathode, an anode, a separator interposed between the cathode and the anode and a non-aqueous electrolyte solution, the separator being prepared by the above-mentioned method of the present invention.

In the lithium secondary battery according to one embodiment of the present invention, the electrodes are not particularly limited, and may be manufactured by binding an electrode active material to an electrode current collector according to a conventional method known in the art.

As active materials used in each electrode, a cathode active material may be any of those that are commonly used in cathodes of conventional electrochemical devices. Non-limiting examples of the cathode active material include lithium manganese oxides, lithium cobalt oxides, lithium nickel oxides, lithium iron oxides, and lithium composite oxides thereof.

Also, an anode active material may be any of those that are commonly used in anodes of conventional electrochemical devices. Non-limiting examples of the anode active material include lithium, lithium alloys, and lithium intercalation materials such as carbon, petroleum coke, activated carbon, graphite and other carbonaceous materials.

Non-limiting examples of a cathode current collector include aluminum foils, nickel foils and a combination thereof. Non-limiting examples of an anode current collector include copper foils, gold foils, nickel foils, copper alloy foils and a combination thereof.

The non-aqueous electrolyte solution may comprise an organic solvent and an electrolyte salt, i.e., a lithium salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$ and a mixture thereof.

The organic solvent used in the non-aqueous electrolyte solution may be one which is conventionally used in an electrolyte solution for a lithium secondary battery. For example, an ether, an ester, an amide, a linear carbonate and a cyclic carbonate may be used alone or as a mixture of two or more.

Among these, a linear carbonate, a cyclic carbonate, or a mixture thereof is representatively used.

The cyclic carbonate compound may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, a halide thereof and a mixture thereof. Examples of the halide include fluoroethylene carbonate (FEC) and the like, but are not limited thereto.

The linear carbonate compound may be any one selected from the group consisting of dimethyl carbonate (DMC), diethyl carbonate (DEC), dipropyl carbonate, ethyl methyl carbonate (EMC), methyl propyl carbonate, ethyl propyl carbonate and a mixture thereof, but is not limited thereto.

In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity.

Also, the ether which may be used as the organic solvent is any one selected from the group consisting of dimethyl ether, diethyl ether, dipropyl ether, methyl ethyl ether, methyl propyl ether, ethyl propyl ether and a mixture thereof, but is not limited thereto.

In addition, the ester which may be used as the organic solvent is any one selected from the group consisting of methyl acetate, ethyl acetate, propyl acetate, methyl propionate, ethyl propionate, γ-butyrolactone, γ-valerolactone, γ-caprolactone, σ-valerolactone, ε-caprolactone and a mixture thereof, but is not limited thereto.

The electrolyte solution may be introduced in any suitable step during the manufacturing of the electrochemical device depending on the manufacturing processes and desired physical properties of a final product. Specifically, the electrolyte may be introduced before assembling a battery or in the final step of the assembling.

In the lithium secondary battery of the present invention, the separator and electrodes may be processed by lamination or stack of a separator and electrodes, and folding. Also, in the present invention, the lithium secondary battery is not particularly limited to its form. For example, the lithium secondary battery may be prepared in a cylindrical form such as a can, a prismatic form, a pouch form, or a coin form.

Hereinafter, preferred examples of the present invention will be described in detail for better understanding. However, the examples of the present invention may be modified in various ways, and they should not be interpreted as limiting the scope of the invention. The examples of the present invention are just for better understanding of the invention to persons having ordinary skill in the art.

Example (1) Formation of Porous Coating Layer 23.75 Parts by weight of $Al_2O_3$ as inorganic particles and 1.25 parts by weight of polyacrylonitrile as a binder polymer were dissolved in 100 parts by weight of acetone to obtain a slurry. The slurry was coated on both surfaces of a polyolefin-based porous substrate (312HT, SK) and dried to form a porous coating layer on the substrate.

(2) Printing of Polymer Particles

100 Parts by weight of polyvinylidene fluoride-co-hexafluoropropylene particles having an average diameter of 0.2 μm (Arkema, Kynar 2751) were used as polymer particles and mixed with 2 parts by weight of silica nanoparticles (Degussa, Aerosil R805). The resulting mixture was put in the cartridge of a laser printer (HP2605dn), in which the polymer particles was brought into electric charging and transferred into the porous substrate having the porous coating layer formed thereon. Thereby, the printing of the polymer particles was completed to form a functional coating layer on the top surface of the porous coating layer. FIG. 1 is an SEM photograph showing a surface of a separator on which polymer particles were transferred.

(3) Fixing of Functional Coating Layer

Figure 2:
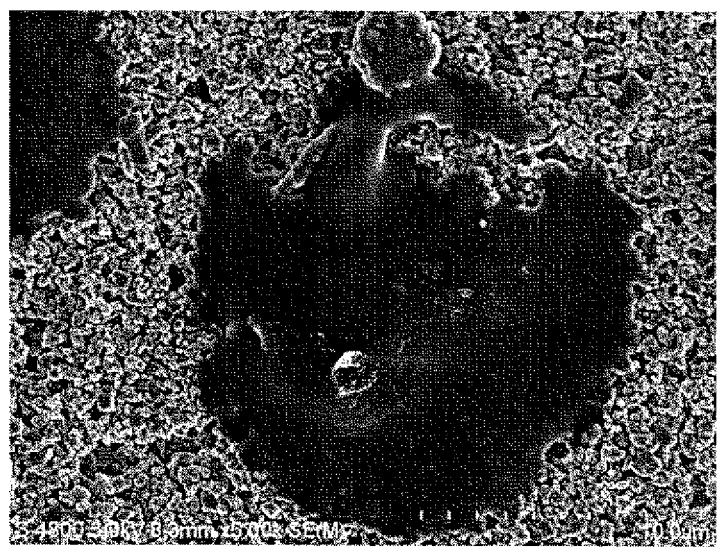
FIG. 2 is an SEM photograph showing a surface of a separator having a functional coating layer fixed thereon, prepared according to one embodiment of the present invention.

The functional coating layer formed on the top surface of the porous coating layer was subject to heat treatment at 110° C. Thereby, a separator having a functional coating layer which would be used as a layer for adhesion with an electrode was finally prepared. FIG. 2 is an SEM photograph showing a surface of a separator on which a functional coating layer is fixed.

Comparative Example

The procedures of the Example were repeated except that the step of printing polymer particles was not carried out to prepare a separator.

Evaluation of Adhesiveness

In order to evaluate adhesiveness between a separator and electrodes, each separator prepared in the above Example and Comparative Example was adhered on an electrode by lamination at 100° C.

As a result, the separator of the Example was confirmed to be well adhered with an electrode, and the adhesiveness of adhesion part was 95 gf/25 mm, which was measured with pulling in the longitudinal direction.

In contrast, the separator of the Comparative Example was not adhered with an electrode.

The foregoing disclosure is given by way of illustration only, and various changes and modifications within the spirit and scope of the disclosure will become apparent to those skilled in the art from this detailed description. Accordingly, it should be understood that the Examples of the present invention are provided for the purpose of illustrations only and to better explain to a person having ordinary skill in the art, and is not intended to limit the scope of the present invention. The scope of the present to be protected should be defined by the claims, all technical spirits equivalent thereto should be interpreted to be fallen within the scope of the present invention.

What is claimed is:

1. A method of preparing a separator for a lithium secondary battery, comprising:
   (1) forming a porous coating layer on at least one surface of a porous substrate, the porous coating layer comprising inorganic particles;
   (2) mixing polymer particles and silica nanoparticles to prepare a mixture;
   (3) treating the mixture, wherein the polymer particles are brought into electric charging to obtain electrically charged polymer particles;
   (4) transferring the treated mixture on the top surface of the porous coating layer to form a functional coating layer for improving adhesion of the separator with electrodes or scavenging transition metals; and
   (5) fixing the functional coating layer with heat and pressure,
   wherein step (2) to step (4) are performed without using a solvent,
   wherein the polymer particles are not in a solvent, and are selected from the group consisting of polyvinylidene fluoride-co-hexafluoropropylene (PVDF-HFP), polyvinylidene fluoride-co-chlorotrifluoroethylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, alginate, carboxyl methyl cellulose and a mixture thereof, and
   wherein the functional coating layer comprises the silica nanoparticles and is uniformly fixed on the top surface of the porous coating layer.

2. The method of claim 1, wherein the porous substrate is selected from the group consisting of high-density polyethylene, low-density polyethylene, linear low-density polyethylene, ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate, and a mixture thereof.

3. The method of claim 1, wherein the inorganic particles are selected from the group consisting of inorganic particles having a dielectric constant of 5 or higher, inorganic particles having the ability to transport lithium ions, and a mixture thereof.

4. The method of claim 3, wherein the inorganic particles having a dielectric constant of 5 or higher are selected from the group consisting of $SrTiO_3$, $SnO_2$, $CeO_2$, MgO, NiO, CaO, ZnO, $ZrO_2$, $SiO_2$, $Y_2O_3$, $Al_2O_3$, AlOOH, $Al(OH)_3$, $TiO_2$, SiC, $BaTiO_3$, $Pb(Zr_x, Ti_{1-x})O_3$ (PZT, $0<x<1$), $Pb_{1-x}La_xZr_{1-y}TiO_3$ (PLZT, $0<x<1$, $0<y<1$), $(1-x)Pb(Mg_{1/3}Nb_{2/3})O_3-xPbTiO_3$ (PMN-PT, $0<x<1$), $HfO_2$ inorganic particles and a mixture thereof.

5. The method of claim 3, wherein the inorganic particles having the ability to transport lithium ions are selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof.

6. The method of claim 1, wherein the inorganic particles have an average diameter of 0.001 to 100 μm.

7. The method of claim 1, wherein the porous coating layer has a thickness of 1 to 100 μm.

8. The method of claim 1, wherein the functional coating layer has a thickness of 0.001 to 5 μm.

9. A separator for a lithium secondary battery, which is prepared by the method of claim 1.

10. A lithium secondary battery comprising a cathode, an anode, a separator interposed between the cathode and the anode and a non-aqueous electrolyte solution,
    wherein the separator is defined in claim 9.

11. The lithium secondary battery of claim 10, wherein the non-aqueous electrolyte solution comprises an organic solvent and an electrolyte salt.

12. The lithium secondary battery of claim 11, wherein the organic solvent is selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, fluoroethylene carbonate (FEC), dimethyl carbonate (DMC), diethyl carbonate (DEC), dipropyl carbonate, ethyl methyl carbonate (EMC), methyl propyl carbonate, ethyl propyl carbonate, methyl acetate, ethyl acetate, propyl acetate, methyl propionate, ethyl propionate, propyl propionate, γ-butyrolactone, γ-valerolactone, γ-caprolactone, σ-valerolactone, ε-caprolactone and a mixture thereof.

13. The lithium secondary battery of claim 11, wherein the electrolyte salt comprises an anion selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$ and a mixture thereof.

14. The method of claim 1, wherein step (3) and step (4) are performed by laser printing.

* * * * *